US 8,918,984 B2

(12) United States Patent
Garson et al.

(10) Patent No.: US 8,918,984 B2
(45) Date of Patent: Dec. 30, 2014

(54) METHOD AND APPARATUS FOR USE IN A VENDING MACHINE (76) Inventors: Brent D. Garson, Orange, OH (US);
Aviel Dafna, Moreland Hills, OH (US);
Alessandro Ratti, Via Varesina (IT);
Ezio Cesare Ratti, Via Manzoni (IT)

(*) Notice: Subject to any disclaimer, the term of this patent is extended or adjusted under 35 U.S.C. 154(b) by 209 days.

(21) Appl. No.: 13/331,335

(22) Filed: Dec. 20, 2011

(65) Prior Publication Data
US 2013/0152377 A1    Jun. 20, 2013

(51) Int. Cl.
*H05K 13/00* (2006.01)
*G01J 1/42* (2006.01)

(52) U.S. Cl.
USPC ............ 29/592.1; 29/720; 29/721; 250/208.1

(58) Field of Classification Search
USPC .................. 29/720, 721, 592.1; 250/208.1
See application file for complete search history.

(56) References Cited

U.S. PATENT DOCUMENTS

| | | | |
|---|---|---|---|
| 6,920,372 B2* | 7/2005 | Nickerson et al. | 700/244 |
| 7,191,034 B2 | 3/2007 | Whitten et al. | |
| 7,286,901 B2 | 10/2007 | Whitten et al. | |
| 8,234,007 B2* | 7/2012 | Garson et al. | 700/236 |
| 8,380,347 B2* | 2/2013 | Garson et al. | 700/244 |
| 2001/0018808 A1* | 9/2001 | Bar-Yona | 40/454 |
| 2005/0143857 A1* | 6/2005 | Chirnomas | 700/244 |
| 2008/0033596 A1 | 2/2008 | Fausak et al. | |
| 2010/0094457 A1* | 4/2010 | Garson et al. | 700/242 |
| 2010/0237091 A1* | 9/2010 | Garson et al. | 221/226 |

\* cited by examiner

*Primary Examiner* — Peter DungBa Vo
*Assistant Examiner* — Kaying Kue
(74) *Attorney, Agent, or Firm* — Tarolli, Sundheim, Covell & Tummino LLP (57) ABSTRACT

During operation of a vending machine, a dispensed product moves from a product dispensing location to a product retrieval location. To detect movement of the dispensed product to the dispensing location, the intensity of light at an array of pixels is monitored. The monitored array of pixels forms a portion of a larger group of pixels. A change in the intensity of light at pixels in the array of pixels is detected upon movement of a dispensed product to a product retrieval location.

13 Claims, 6 Drawing Sheets

METHOD AND APPARATUS FOR USE IN A VENDING MACHINE

BACKGROUND OF THE INVENTION

The present invention relates to a new and improved method and apparatus for use in a vending machine which dispenses products to customers.

Vending machines have been utilized to provide various snacks, beverages and other products to customers. When a customer has selected a product, the customer inserts money or a credit card into the known vending machine. In addition, the customer actuates a selection switch panel to indicate the location of the product which has been selected. When this has occurred, a dispensing device for the selected product is operated. The selected product then moves from a dispensing location to a product retrieval location. The customer manually retrieves the product at the product retrieval location.

During the use of these known vending machines, there is a possibility of a failed transaction. In a failed transaction, the machine attempts to dispense a product selected by a customer but fails to have the product move to the product retrieval location where it is accessible to the customer. In such a situation, the machine may assume that the selected product was dispensed and may not account to the customer for the product which failed to be dispensed.

Thus, after paying for the selected product, the customer may fail to receive the product. This may result in the customer becoming frustrated with the vending machine. Frustrated customers result in poor relations between the company operating the vending machine and the customer and may adversely affect sales from vending machines.

To prevent customers from becoming frustrated at a failure of a vending machine to dispense a selected product to a product retrieval location, devices have been provided to detect when a selected product moves to a product retrieval location. Known vending machines having devices to detect when a product moves to a product retrieval location are disclosed in U.S. Pat. Nos. 6,920,372; 7,191,034; and 7,286,901. In addition, such a device is disclosed in United States Published Patent Application 2008/0033596.

One of the draw backs of these known dispensed product detection devices is the cost of installing the devices in a vending machine. Accordingly, it is desirable to minimize the cost of a dispensed product detection device used in a vending machine. It is also desirable to facilitate installation of a dispensed product detection device in a vending machine.

SUMMARY OF THE INVENTION

The present invention provides a new and improved method and apparatus for use in a vending machine having a plurality of product dispensing devices. Each of the product dispensing devices holds a product to be dispensed from the dispensing device. In accordance with one of the features of the present invention, an array of pixels is monitored to detect a change in the intensity of light at the pixels in the array upon movement of a dispensed product from a product dispensing location to a product retrieval location.

In accordance with another feature of the invention, a group of pixels is provided and the aforementioned array of monitored pixels forms part of the group of pixels. The monitored array of pixels contains a number of pixels which is less than the total number of pixels in the group of pixels. The pixels which are selected to form the array of monitored pixels have fields of view which form a desired pattern across at least a portion of a path along which a dispensed product moves from a dispensing location to a product retrieval location. The number of monitored pixels in the array of monitored pixels may advantageously be less than fifty (50%) of the pixels in the group of pixels and even more advantageously be less than twenty (20%) of the pixels in the group of pixels.

The present invention has a number of features. These features may be utilized together as disclosed herein. These features may be utilized separately and/or in various combinations with each other or the prior art.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC EMBODIMENTS OF THE INVENTION GENERAL DESCRIPTION

A vending machine 10 (FIG. 1) is constructed and operated in accordance with the present invention. The vending machine 10 includes a rectangular housing 12 having side walls 14 and a door 16. The door 16 has a transparent window or panel 20. The door 16 is pivotally mounted on hinges (not shown) connected with the side walls 14 in a known manner.

Figure 1:
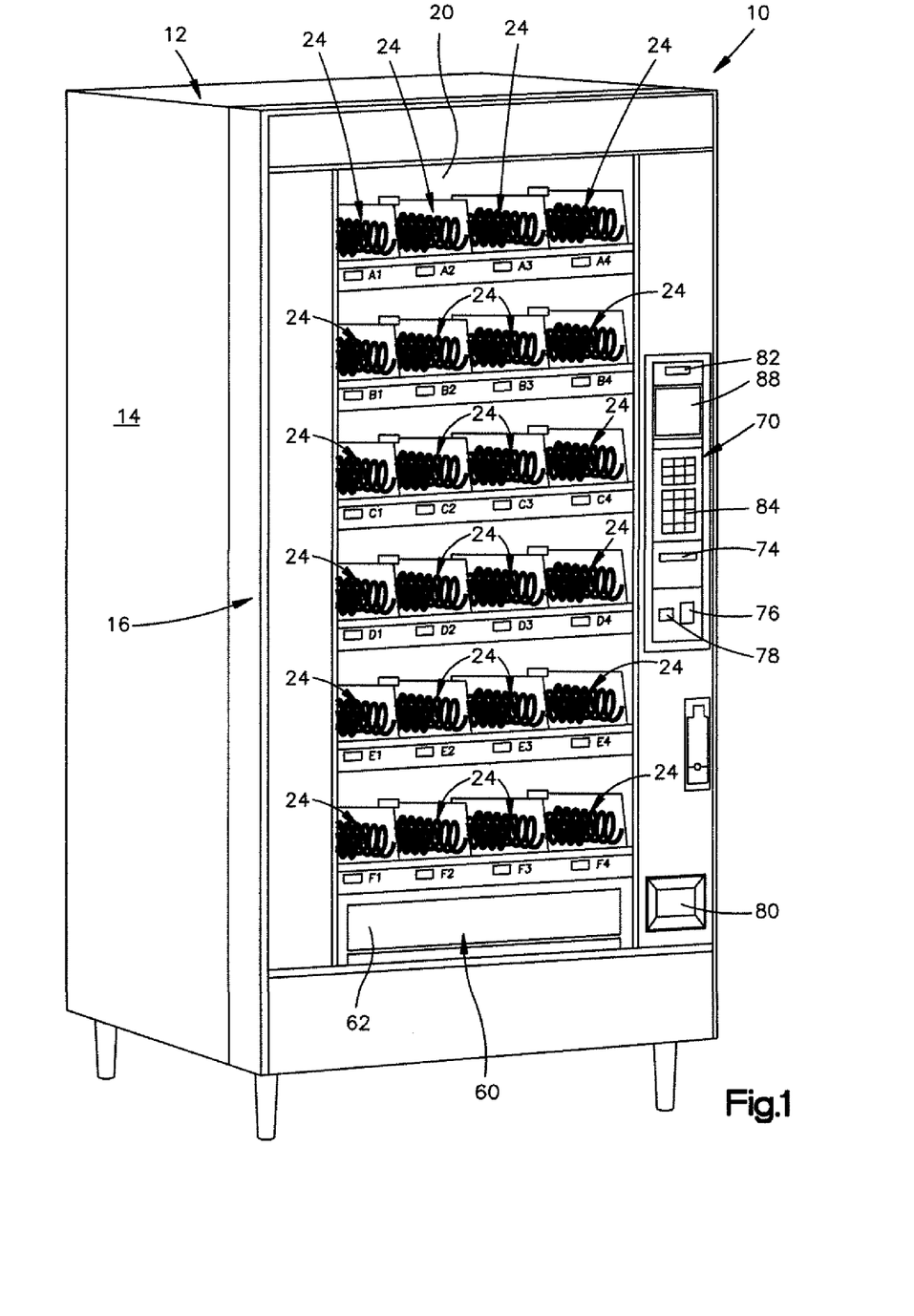
FIG. 1 is a schematic illustration of one example of a vending machine which is constructed and operated in accordance with the present invention.

Disposed within the housing 12 is a plurality of product dispensing devices 24. The product dispensing devices 24 are visible through the glass window 20 in the door 16. In FIG. 1, the product dispensing devices are all shown as being empty, that is, before the product dispensing devices are stocked with products to be dispensed. It should be understood that the product dispensing devices may have any desired construction and may be used to dispense any desired product. It should also be understood that the door 16 may not have a transparent window through which the product dispensing devices 24 are visible.

Each of the product dispensing devices 24 includes a conveyor assembly 40 (FIG. 2) which engages the products to be dispensed. Each of the conveyor assemblies 40 has a known construction. Each of the illustrated conveyor assemblies 40 includes a pair of helical conveyor elements 42 and 44 which engage the products to be dispensed. The helical conveyor elements 42 and 44 are rotatable about their parallel longitudinal central axes relative to a tray (not shown) on which the products are disposed. The helical conveyor elements 42 and 44 may be referred to as "spirals". If desired, the conveyor assembly 40 may include only a single conveyor element 42 or 44.

It is contemplated that the conveyor assembly 40 may have a different construction. For example, the conveyor assembly 40 may include a gripper which is movable along an X axis and along a Y axis relative to the rectangular array of product dispensing devices 24 (FIG. 1). The gripper will is moved into alignment with a selected product and used to grip the selected product. The gripper is then moved to release the product at a product retrieval location.

When a product is to be dispensed from a product dispensing location 54 (FIG. 2) and a next succeeding product is to be advanced from a product storage location 52 to the product dispensing location, the helical conveyor elements 42 and 44 are rotated in opposite directions about their longitudinal central axes. Thus, the conveyor element 42 is rotated in a counterclockwise direction (as viewed in FIG. 2) about its longitudinal central axis while the conveyor element 40 is rotated in a clockwise direction about its longitudinal central axis.

The rotation of the two conveyor elements 42 and 44 is effective to move a product from the dispensing location 54. The dispensed product drops downward between trays and the window 20 onto a shelf (not shown) at the product retrieval location 60 (FIG. 1) in the vending machine. As this occurs, the product moves downward along a path or channel formed between the shelves and an inner side of the door 16. An upper end portion of the path of movement of the dispensed product is disposed at a dispensing location 54. A lower end portion of the path of movement of the dispensed product is disposed at the product retrieval location 60.

The customer then manually pivots a delivery door 62 to gain access to a dispensed product on the shelf at the product retrieval location 60. At the same time, the conveyor elements 42 and 44 move a next succeeding product from a product storage location 52 (FIG. 2) to the product dispensing location 54. If desired, a product retrieval location 60 (FIG. 1) having a different construction may be utilized.

Although the dispensed product moves downward from the product dispensing location 54 (FIG. 2) to the product retrieval location 60 (FIG. 1) under the influence of gravity, it is contemplated that the dispensed product may be moved from the product dispensing location to the product retrieval location by movement of a gripper along a support member. The dispensed product may be moved upwardly from a product dispensing location to a product retrieval location.

Although the illustrated conveyor assemblies 40 utilize helical conveyor elements 42 and 44 to sequentially move products forward from storage locations 52 toward the product dispensing locations 54, one or more of the conveyor assemblies may include only the single helix. A different type of conveyor assembly may be used if desired. For example, indexing or pusher elements may be connected with a continuous belt or chain conveyor and utilized to push products to a dispensing location 54 and then to push each product in turn from the dispensing location. Alternatively, a circular disc may be intermittingly rotated to move products to a dispensing location 54. As still another example, gripper assembly movable along horizontal and vertical axes may be utilized to sequentially move products from product dispensing locations 54 (FIG. 2) to a product retrieval location 60 (FIG. 1).

A control panel 70 is mounted on the door 16 of the vending machine 10. The control panel 70 includes various items with which the customer interacts to purchase one or more of the products being sold by the vending machine. The control panel 70 includes a bill validator insert 74 where paper money may be inserted into the vending machine 10. In addition, the control panel 70 includes a coin insert 76 where coins may be inserted into the vending machine 10. If used, a coin scavenger button 78 is nearly actuatable to have coins returned to a coin return 80. Rather than depositing money, a credit/debit card may be used to pay for a purchase. A credit display window 82 indicates the amount of money which has been deposited or charged.

A selector switch keyboard 84 is manually actuable to enable a product letter and number, corresponding to indicia associated with a product to be entered. When the indicia corresponding to a desired product is entered at the keyboard 84, the product dispensing device 24 for the selected product is activated to move the selected product from a dispensing location 54. Operation of the selected product dispensing device is also effective to move a next succeeding product to the product dispensing location 54.

As the selected product moves from the product dispensing location 54, it falls downward to the product retrieval location 60. If the customer is entitled to change from the money which was inserted into the machine, the change is returned at the coin return 80. It should be understood that the selected product may reach the product retrieval location 60 in ways other than falling. For example, the product could be scooped or set on a shelf. If desired, various elevators or X/Y delivery systems may be used. These known delivery systems may be used to move a product upward to a product retrieval location.

In addition, the control panel 70 includes a display 80 where indicia relative to a selected product may be displayed.

The indicia may indicate the characteristics of a selected product such as the number of calories, ingredients and/or food value. If desired, the display 88 may be omitted.

The illustrated vending machine 10 has the same construction and mode of operation as described in co-pending U.S. patent application Ser. No. 12/250,269 filed Oct. 13, 2008 and entitled Method and Apparatus for Use in a Vending Machine. The disclosure in the aforementioned U.S. patent application Ser. No. 12/250,269 is hereby incorporated herein in its entirety by this reference thereto. The illustrated vending machine 10 also has a construction which is similar to the general construction and mode of operation of a Model 148 vending machine which is commercially available from Crane-National Vendors having a place of business at 12955 Enterprise Way, Bridgeton, Mo. 63044. However, it should be understood that the vending machine 10 may have a different construction. The features of the invention are not to be considered as being limited to a vending machine having any one specific type of construction.

Dispensed Product Detection Apparatus

A dispensed product detection apparatus 100 (FIG. 2) constructed and operated in accordance with the present invention includes a sensor assembly 104. The sensor assembly 104 is connected with electronic controls and processing apparatus, that is, a computer 106. Upon movement of a dispensed product from a product dispensing location 54 to the product retrieval location 60, the sensor assembly 104 detects the dispensed product. In the illustrated embodiment of the invention, the dispensed product is detected by the sensor assembly 104 while the dispensed product is moving downward toward the retrieval location 60. However, the sensor assembly 104 may be used to detect the dispensed product while the dispensed product is stationary or while the dispensed product is moving upwardly toward a retrieval location.

Figure 2:
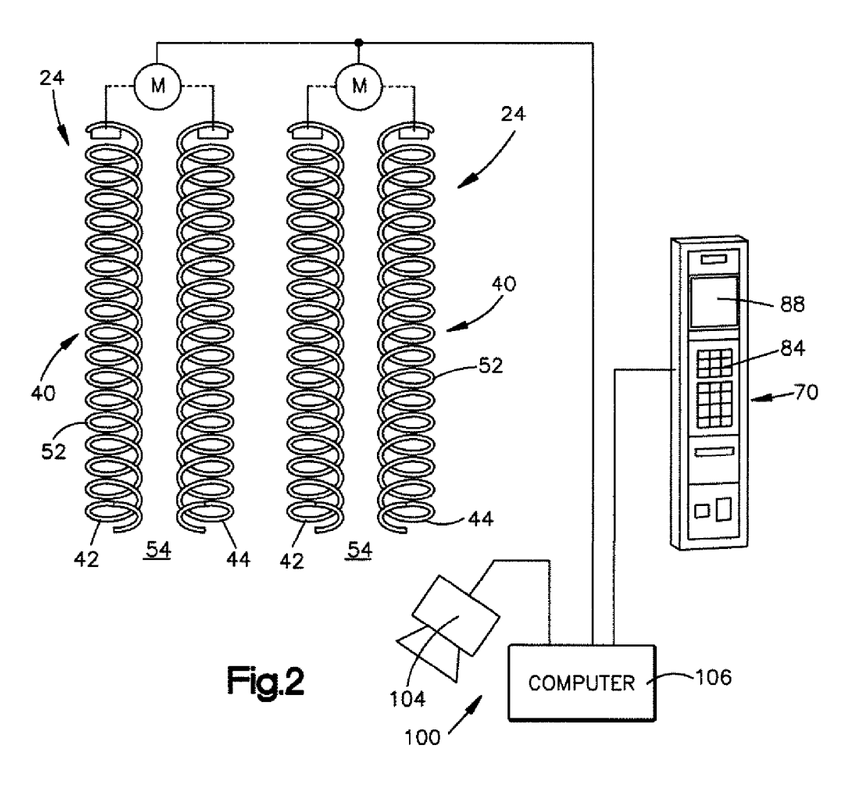
FIG. 2 is a schematic illustration of controls which are utilized in the vending machine of FIG. 1.

In response to detection of the dispensed product by the sensor assembly 104, electronic circuitry in the sensor assembly provides a control signal to the computer 106 indicating that a product has been successfully dispensed. If a customer activates the control panel 70 to dispense a desired product and, in the unlikely event that the product is not dispensed, the sensor assembly 104 will not provide a control signal to the computer 106. This will enable the computer 106 to determine when a successful dispensing operation has been completed.

Figure 3:
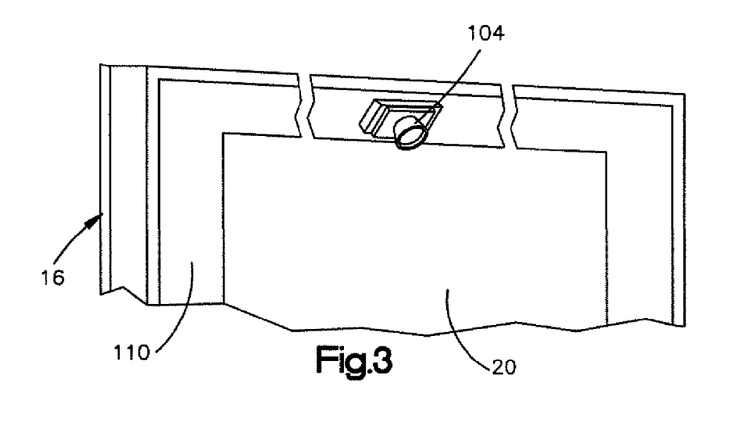
FIG. 3 is an enlarged fragmentary schematic illustration depicting one of the locations in which an imaging device containing a group of pixels may be mounted in the vending machine of FIG. 1.

The sensor assembly 104 may be mounted at any desired location within the vending machine 10. In FIG. 3, the sensor assembly 104 is mounted on the upper end portion of the door 16. In this specific embodiment, the sensor assembly 104 is mounted on a rectangular frame 110 of the door 16. The frame 110 extends around the glass window 20 in the door 16.

If desired, the sensor assembly 104 may be mounted on the window 20 rather than the frame 110. Alternatively, the sensor assembly 104 may be mounted on one of the side walls 14 (FIG. 1) of the vending machine 10. It is contemplated that an opaque panel may be substituted for the transparent window 20. If this is done, the sensor assembly 104 may be mounted on the opaque panel.

In the illustrated embodiment of the invention, a single sensor assembly 104 is mounted on the upper central portion of the door 16 (FIG. 3). However, it is contemplated that the plurality of sensor assemblies may be utilized. For example, a pair of sensor assemblies 114 and 116 may be mounted at opposite corner portions of the door 16 in the manner illustrated schematically in FIG. 4. The sensor assemblies 114 and 116 may be used with or without the sensor assembly 104.

Figure 4:
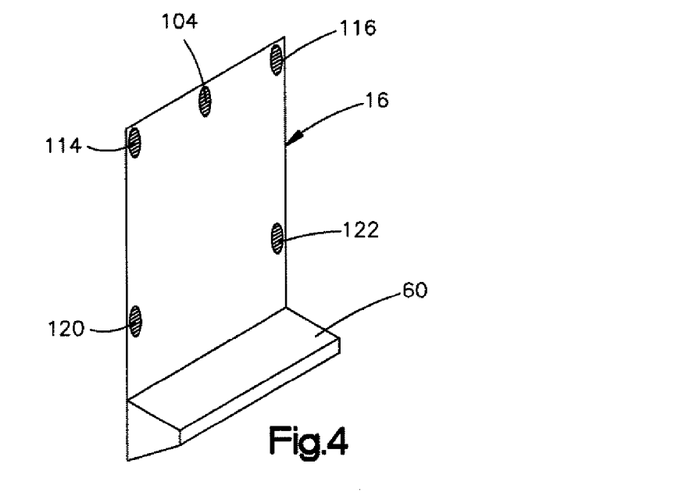
FIG. 4 is a highly schematized illustration depicting the manner in which a plurality of imaging devices may be mounted in the vending machine illustrated in FIG. 1.

If desired, a pair of sensor assemblies 120 and 122 may be mounted on opposite sides of the door 16 in the manner illustrated schematically in FIG. 4. The sensor assemblies 120 and 122 may be used without the sensor assemblies 104, 114 and/or 116. Of course, the sensor assemblies 120 and 122 may be used with one or more of the sensor assemblies 104, 114 and 116. For example, sensor assemblies 120 and 122 may be used with the sensor assembly 104. Of course, the sensor assembly 104 may be used without the sensor assemblies 120 and 122.

Although the sensor assemblies 104, 114, 116, 120 and 122 have been illustrated as being mounted on the door 16, the sensor assemblies may be mounted at other locations in the vending machine 10. For example, one or more sensor assemblies may be mounted on a portion of the vending machine disposed below the product dispensing locations and spaced from the door 16.

Pixels

Figure 5:
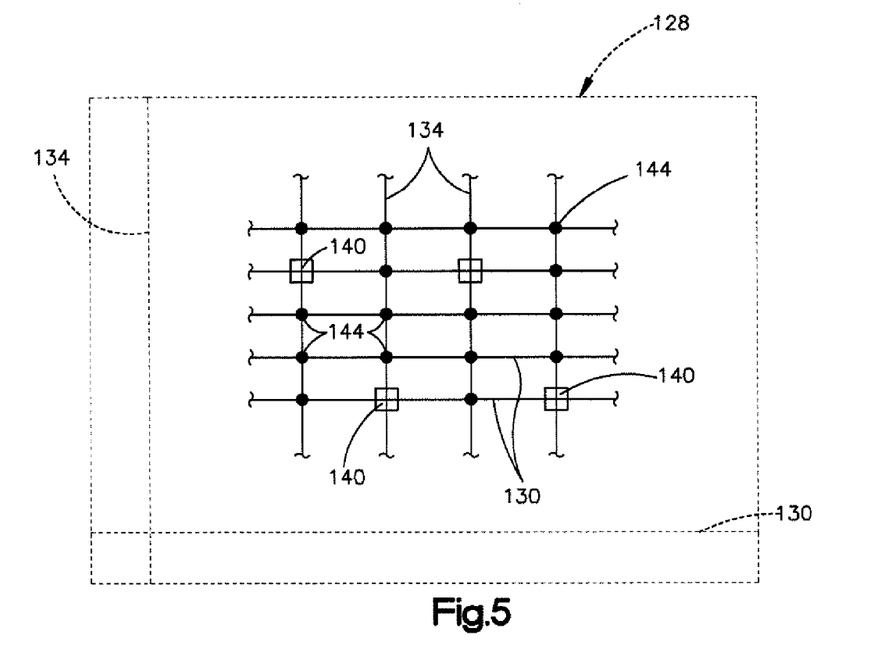
FIG. 5 is a schematic illustration depicting a group of pixels which are included in one or more of the imaging devices of FIGS. 3 and 4 and illustrating a relationship between a relatively small array of monitored pixels and the relatively large group of pixels.

In accordance with one of the features of the present invention the sensor assembly 104 and/or the sensor assemblies 114, 116, 120 and/or 122 include a group 128 of pixels (FIG. 5). Each pixel of the group 128 of pixels is a photosensor which converts light energy to a voltage. The group 128 of pixels may be of any desired size and may contain a desired number of pixels. The group 128 of pixels may be disposed in a single sensor assembly 104 or a plurality of sensor assemblies.

The illustrated group 128 of pixels has a generally rectangular configuration and includes 307,200 pixels. Rows 130 of pixels are crossed by columns 134 of pixels. Each column 134 contains 480 pixels. Each row 130 contains 640 pixels. A greater or lesser number of pixels may be provided in the rows 130 and columns 134.

Each pixel in the group 128 of pixels is disposed in one of the columns 134 and one of the rows 130 of pixels. One specific group 128 of pixels had 640 columns and 480 rows containing 307,200 pixels. It should be understood that the group 128 of pixels may contain a different number of rows 130 and columns 134. Although the group 128 of pixels is disposed in a single sensor assembly 104, the group of pixels may be disposed in two or more sensor assemblies. For example, the group 128 of pixels may be disposed in the sensor assemblies 120 and 122 of FIG. 4.

The illustrated group 128 of pixels has a rectangular configuration. However, the group 128 of pixels may have a different configuration. For example, the group 128 of pixels may be disposed in two or more circular groups of pixels.

In FIG. 5, a fragmentary portion of the rectangular group 128 of pixels has been enlarged and each pixel is disposed where one of the rows 130 and one of the columns 134 of pixels cross. In accordance with one of the features of the present invention, only a portion of the pixels in the group 128 of pixels are monitored to determine when there is a change in the intensity of the light or illumination to which the pixel is exposed. Other pixels in the group 128 of pixels are not monitored.

The monitored pixels 140 have been indicated by rectangles in the enlarged portion of FIG. 5. Pixels which are not monitored, that is, nonmonitored pixels 144, have been indicated by circles in the fragmentary portion of FIG. 5. The monitored pixels 140 and the nonmonitored pixels 144 may be disposed in any one of the sensor assemblies 104, 114, 116, 120 or 122. Alternatively, the monitored pixels 140 and the nonmonitored pixels 144 may be disposed in two or more of the sensor assemblies 104, 114, 116, 120 and 122.

The group 128 of pixels includes a relatively large number of non-monitored pixels 144 (indicated by circles in FIG. 5)

and a relatively small number of monitored pixels 140 (indicated by squares in FIG. 5). The monitored pixels 140 form less than 50% of the total number of pixels in the group 128 of pixels. It is contemplated that it may be desired to have the number of monitored pixels 140 be less than 20% of the total number of pixels in the group of pixels 128. In one specific embodiment of the invention, the monitored pixels 140 included less than 3% of the total number of pixels in the group 128 of pixels.

By monitoring only a percentage of the pixels in the group 128 of pixels, the cost of fabricating the sensor assembly 104 (FIG. 2) tends to be minimized. This is because control circuitry and computer processing capability which must be associated with the sensor assembly 104 is reduced by monitoring only a portion of the total number of pixels in the group 128 of pixels. Of course, reducing the processing capability which must be utilized with the sensor assembly 104 reduces the cost of the sensor assembly.

The sensor assembly 104 includes an image sensor containing the group 128 of pixels. The group 128 of pixels turn light into discreet control signals. Although the sensor assembly 104 may be any one of many different known types of image sensors that converts an optical image into an electrical control signal, the sensor assembly 104 is the well-known complementary metal-oxide-semiconductor (CMSO) active pixel sensor. Electrical circuitry next to each monitored photo sensor (pixel) transmits a control signal which varies as a function of variations in the intensity of the light to which the associated pixel 140 is exposed.

The group 128 of pixels is a typical two-dimensional group of pixels organized into rows and columns. An array of monitored pixels 140, in the group 128 of pixels, has a desired pattern. Monitored pixels 140 in a given row share reset lines so that all of the monitored pixels 140 in a row are reset at the same time. Row select lines of each monitored pixel 140 in a row are electrically interconnected as well. The outputs of each monitored pixel 140 in a given column are electrically interconnected. The sensor 104 continuously functions and may be considered to be similar to a video camera.

Monitored Pixels

One active pixel sensor 150 (FIG. 6) is provided for each of the monitored pixels 140. The active pixel sensor 150 is of the three transistor cell type. However, the active pixel sensor 150 may be a 4, 5, or 6 transistor cell if desired. Of course, other types of control circuitry may be associated with each of the monitored pixels 140.

Figure 6:
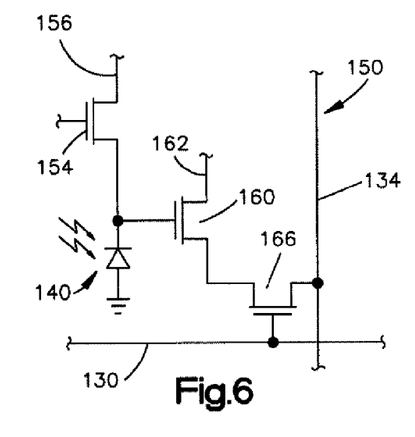
FIG. 6 is a schematic illustration depicting the manner in which a monitored pixel in the array of pixels may be connected with control circuitry.

The active pixel sensor 150 is associated with a monitored pixel 140 (FIGS. 5 and 6). The monitored pixel 140 is a photo detector element or photo diode which converts light into an electrical control signal. A reset transistor 154 is of the n-type. The reset transistor 154 acts as a switch to reset the pixel or photo diode 140 (FIG. 6).

When the reset transistor 154 is turned on, the photo diode 140 is connected to a power supply by a conductor 156 (FIG. 6). When the reset transistor 154 is turned on, all integrated charge is cleared from the reset transistor. A read-out transistor 160 acts as a buffer amplifier (specifically, a source follower) which allows the pixel voltage to be absorbed without removing the accumulated charge. The read-out transistor 160 is connected with a power supply by a conductor 162. If desired, the conductors 156 and 162 may be connected to the same power supply. A select transistor 166 allows a single row of monitored pixels 140 in the array of monitored pixels to be read by read-out electronics.

An imaging lens 170 (FIG. 7) is associated with the array of monitored pixels 140. The imaging lens 170 focuses rays of light emanating from a focal plane 174 onto a monitored pixel 140. The focal plane 174 may be anywhere along a field of view 176 of a monitored pixel 140. The fields of view 176 of the array of monitored pixels 140 may be located in or extend into a channel or path along which a dispensed product moves from a dispensing location 54 to the product retrieval location 60. The focal plane 174 may be disposed at a surface in the retrieval location 60.

Figure 7:
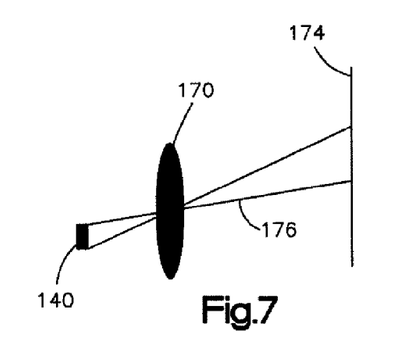
FIG. 7 is a schematic illustration depicting the field of view of one of the monitored pixels in the array of pixels.

The location of the fields of view 176 of the monitored pixels 140 in the space or channel along which dispensed products move is such that any product dispensed from any one of the product dispensing locations 54 will pass through a plurality of the fields of view. The configuration of the array of monitored pixels 140 is such that the fields of view 176 of the monitored pixels have a desired pattern in the space or channel along which dispensed products move.

Pixel Installation—Alignment

The group 128 of pixels 140 and 144 should be accurately positioned relative to vending machine 10 and particularly relative to the product retrieval location 60. If the group 128 of pixels is being installed in a vending machine by an original equipment manufacturer during initial fabrication of the vending machine, it is relatively easy to accurately position the group 128 of pixels relative to the channel or path along which dispensed products move from the dispensing locations 54 to the product retrieval location 60. However, when the group 128 of pixels is to be retrofitted into an existing vending machine, installation of the group 128 of pixels may be more difficult.

Figure 8:
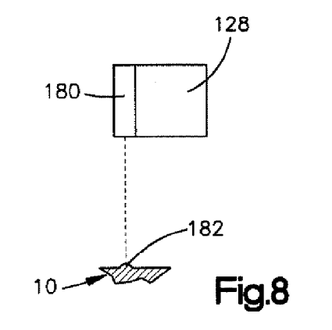
FIG. 8 is a schematic illustration depicting the manner in which a laser may be associated with the group of pixels of FIG. 5 to facilitate aligning the array of monitored with the vending machine of FIG. 1.

To facilitate installation of the group 128 of pixels as original equipment or a retrofit, a laser 180 (FIG. 8) may be mechanically fixed with the group 128 of pixels. A beam from the laser is directed to a predetermined location, indicated at 182 in FIG. 8, in the vending machine 10. The visible laser spot is used to locate the position where the group of pixels is to be located. Once the group 128 of pixels has been accurately located relative to the vending machine 10 using the laser 180, the group 128 of pixels is fixedly connected to the vending machine. Once this has been done, the laser 180 may be disconnected from the group 128 of pixels and utilized for the subsequent installation of a group of pixels in another vending machine. Of course, the laser 180 may be left in a vending machine along with a group of pixels 128 after the group of pixels have been fixedly connected with the vending machine.

Alternatively, an alignment bar 186 (FIG. 9) may be utilized to accurately position the group 128 of pixels relative to the vending machine 10. The alignment bar 186 includes LEDs (light emitting diodes) 188 and 190. The LEDs 188 and 190 are mounted at opposite ends of the bar. If desired, one or more LEDs may be provided on a central portion of the alignment bar.

Figure 9:
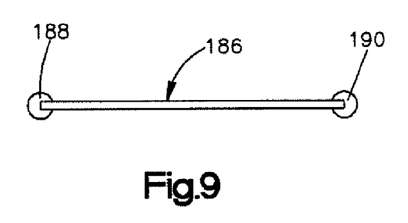
FIG. 9 is a schematic illustration of a positioning member having a plurality of light sources which may be used to determined reference locations in the group of pixels of FIG. 5.

The alignment bar 186 is positioned at a predetermined location in a vending machine. For example, at the product retrieval location 60. As another example, the alignment bar 186 may be positioned across or beside a path along which dispensed products move to the product retrieval location 60.

Once this has been done, a group 128 of pixels in tentatively mounted in the vending machine 10. An image is taken with the light emitting diodes 188 and 190 turned off, that is, deenergized. The intensity of the light absorbed by the monitored pixels 140 in the group 128 of pixels is stored. Thereafter, the light emitting diodes 188 and 190 are turned on (energized) and the intensity of light at the monitored pixels 140 in the group 128 of pixels is again stored.

The areas where the energized light emitting diodes are imaged will have a substantially larger light intensity than the light intensity viewed by the other pixels in the group 128 of pixels. Two resulting areas having a high light intensity, that is, areas in which the monitored pixels 140 have fields of view 176 containing the light emitting diodes 188 and 190, are considered to be reference areas or dots. The group 128 of pixels is moved to align the array of monitored pixels 140 with the reference locations formed by the light emitting diodes 188 and 190. Thus, the group 128 of pixels is positioned in the vending machine so that the reference locations in the array of monitored pixels 140 are at predetermined locations relative to the light emitting diodes 188 and 190 at opposite ends of the alignment bar 186.

The alignment bar 186 may then be removed from the vending machine 10. Alternatively, the alignment bar 186 may be left in the vending machine and utilized to correct any subsequent misalignment of the group 128 of pixels.

Figure 10:
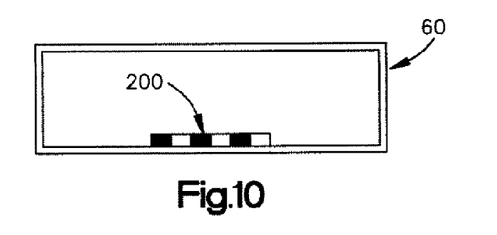
FIG. 10 is a schematic illustration depicting the manner in which a pattern may be provided in the vending machine of FIG. 1 to facilitate alignment of the group of pixels of FIG. 5 with the vending machine.

Rather than using an alignment bar 186 or similar tool, an easily detected pattern 200 (FIG. 10) may be positioned on or adjacent to the product retrieval location 60. The pattern 200 can be left in place at the product retrieval location 60 if the pattern does not interfere with normal operation of the vending machine 10. Alternatively, the pattern 200 may be removed after the group 128 of pixels has been aligned with the vending machine. An algorithm is provided in the computer 106 (FIG. 2). This algorithm enables the computer to detect the pattern 200, as sensed by the monitored pixels 140 in the array of monitored pixels in the group 128 of pixels (FIG. 5).

Detecting a Dispensed Product

Each monitored pixel 140 (FIG. 5) has a reference or initial output signal which varies as a function of the intensity of the ambient light to which the pixel is exposed. This initial output signal or intensity is stored and used as a reference value. By comparing the reference (initial) output signal of a monitored pixel 140 to the instantaneous output signal, a change in light conditions in the field of view 176 (FIG. 7) of the monitored pixel can be detected. This change in light conditions may be caused by a dispensed product moving into the field of view of the monitored pixel 140.

By continuously comparing the actual output signal of a monitored pixel 140 to the reference output signal for the monitored pixel, a change in the output signal from the monitored pixel 140 can be detected. When the change in the output signal from a monitored pixel 140 is greater than a predetermined value (threshold 1), a dispensed product will probably have moved into the field of view 176 of the monitored pixel. When the output signal from a monitored pixel is greater than threshold 1, the pixel is referred to as being activated.

When a dispensed product moves from a product dispensing location 54 (FIG. 2) to a product retrieval location 60 (FIG. 1), the dispensed product passes through the fields of view 176 (FIG. 7) of a plurality of the monitored pixels 140. The monitored pixels 140 having fields of view through which the dispensed product passes become activated due to the increased light intensity to which the pixels are exposed. The increase in light intensity to which a monitored pixel 140 is exposed is caused by reflection of light from the dispensed product. By continuously comparing the actual output signals of all of the monitored pixels 140 to their reference outputs, movement of a dispensed product from a product dispensing location 54 to a product retrieval location 60 can be detected whenever dispensing of a product occurs.

A dispensed product is detected by the monitored pixels 140 (FIG. 5) when a number of monitored pixels greater than a predetermined number of pixels (threshold 2) are activated. These activated monitored pixels 140 have an output which is greater than their reference output by more than the aforementioned predetermined value (threshold 1). Thus, when a product is dispensed, it moves into the field of view of more than a predetermined number (threshold 2) of monitored pixels 140 and causes their output signals to increase to more than a predetermined value (threshold 1).

To filter some noise and spurious activation of monitored pixels 140, the number of activated monitored pixels must be over threshold 2 for a predetermined length of time (threshold 3). The predetermined length of time (threshold 3) for which a dispensed product is detected by the array of monitored pixels 140 can be referred to as being a predetermined number of consecutive frames. At each frame, the predetermined number of monitored pixels 140 (threshold 2) is in an active or sensing condition (threshold 1) due to movement of a dispensed product through the fields of view 176 of at least the predetermined number of monitored pixels (threshold 2).

It is contemplated that the various thresholds, that is, threshold 1, threshold 2, and threshold 3, may vary as a function of the construction of a particular vending machine 10, the size and other characteristics of the products to be dispensed, the characteristics of the monitored pixels 140, and other factors. Although it is contemplated that the various thresholds may be any desired value, in one specific embodiment of the invention, threshold 1 was an increase of approximately 12.5 percent (%) of the initial or inactive output signal of a monitored pixel 140. Thus, when the output signal of one of the monitored pixels 140 (FIG. 5) increases by approximately 12.5%, that pixel will have changed from an initial or inactive condition to the sensing or active condition.

In the specific embodiment of the invention referred to in the preceding paragraph, a predetermined number of monitored pixels 140 (threshold 2) must change from the inactive condition to the active condition by detecting a dispensed product. In this embodiment, threshold 2 is reached when a dispensed product is detected by 32 of the monitored pixels 140. Threshold 2 is, in this specific embodiment of the invention, 32 active monitored pixels 140. Of course threshold 2 may be any desired number of active monitored pixels 140. In this embodiment of the invention, there were 307,200 pixels in the group 128 of pixels. In this embodiment of the invention, there were approximately 1,280 monitored pixels 140.

To minimize the possibility of a false indication by the array of monitored pixels 140, the output from the active monitored pixels must be above threshold 1 for a number of active monitored pixels greater than threshold 2 for a length of time equal to approximately 0.0667 seconds (threshold 3). Assuming that there is a frame rate of sixty frames per second, the output of 32 active monitored pixels (threshold 2) will have to be more than 12.5% of the initial output (threshold 1) for a period of four (4) frames, that is, 0.0667 seconds.

It should be understood that the foregoing specific values for threshold 1, threshold 2, threshold 3, number of monitored pixels 140, and total number of pixels in the group 128 have been set forth herein for purposes of clarity of description. It is believed that specific embodiments of the invention may utilize different threshold values and numbers of pixels. For example, the size of a dispensed product and/or the pattern in which the array of monitored pixels 140 is disposed may result in a requirement that threshold 2 be either greater than or less than 32 monitored pixels 140.

Figure 11:
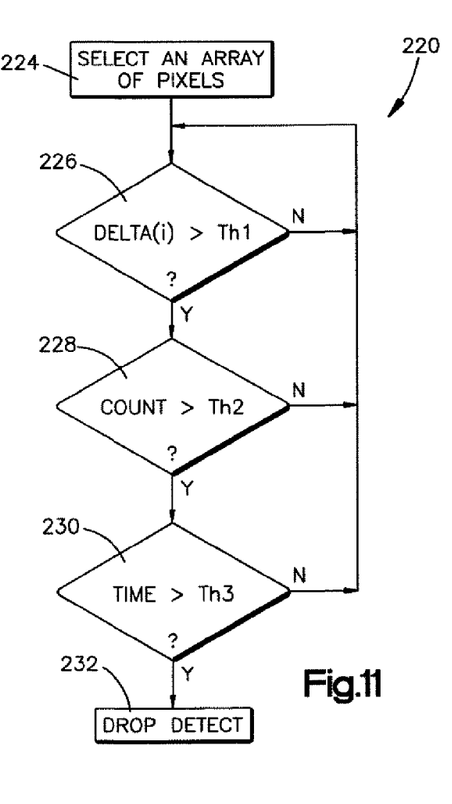
FIG. 11 is a drop detection flow chart depicting the manner in which monitored pixels of FIG. 5 detect movement of a dispensed product to a product retrieval location in the vending machine of FIG. 1.

A drop detection flowchart 220 is set forth in FIG. 11. The first step depicted by the flowchart 220 is step 224 of selecting an array of monitored pixels 140 (FIG. 5) from the group 128 of pixels. In order to minimize the cost of the dispensed product detection apparatus 100, (FIG. 2) the selected array of monitored pixels 140 contains a substantially smaller number of pixels than the total number of pixels 140 and 144 in the group 128 of pixels.

As was previously mentioned, the monitored pixels 140 comprise less than fifty percent (50%) of the total number of pixels in the group 128 of pixels. In vending machines in which the dispensed product detection apparatus 100 has been used, the monitored pixels 140 have been less than twenty percent (20%) of the total number of pixels in the group 128 of pixels. In one specific embodiment of the invention, the monitored pixels 140 were disposed in an array which contained only approximately one percent (1%) of the total number of pixels in the group 128 of pixels. Thus, in a group 128 of pixels containing 307,200 (640×480) pixels, approximately 1,280 pixels were disposed in the array of monitored pixels 140. By minimizing the number of monitored pixels 140 in the group 128 of pixels, the cost of computing power associated with the dispensed product detection apparatus 100 tends to be minimized.

Once an array of monitored pixels 140 has been selected, the initial output from the monitored pixels due to ambient conditions, when a product is not moving from a product dispensing location 54 (FIG. 2) to the product retrieval location 60, is stored as an initial or reference output signal or intensity. In the step indicated at 226 in the drop detection flow chart 220 (FIG. 11), the actual output of each of the monitored pixels 140 is compared to the stored reference or initial output signal. If the output signal from all of the monitored pixels 140 is less than threshold 1, step 226 is repeated. If the output from any one of the monitored pixels 140 is greater than threshold 1, the process of the flowchart 220 advances to step 228.

In one specific embodiment of the invention, threshold 1 was taken as being the sum of the initial reference output of a monitored pixel 140 plus 12.5% of the initial or reference output. Thus, in this specific embodiment, a monitored pixel 140 was considered to be activated when its output signal exceeded its initial or reference output signal by 12.5% of the initial or reference output. In this specific embodiment of the invention, threshold 1 is exceeded and the process advances to step 228 if the output signal from one of the monitored pixels 140 is greater than one hundred twelve point five percent (112.5%) of the initial or reference output signal for that pixel. Of course, other embodiments may have different values for threshold 1.

Assuming that one or more of the monitored pixels 140 has an output which exceeds threshold 1, step 228 of the drop detection flow chart 220 is undertaken to determine if the number of pixels which exceeds threshold 1 is sufficiently high so as to be indicative of the detection of a dispensed product moving from a product dispensing location 54 to the product retrieval location 60. If a dispensed product is in fact being sensed by the monitored pixels 140, the number of pixels having an intensity which exceeds threshold 1 will be greater than threshold 2. If desired, a filter may be added to the control circuitry to eliminate consideration of pixels which are spaced apart by a distance which exceeds the size of a dispensed product.

In one specific embodiment of the dispensed product detection apparatus 100, threshold 2 was 32 activated monitored pixels 140. If the number of monitored pixels having an output which exceeds threshold 1 is not greater than threshold 2, the foregoing steps, that is, steps 226 and 228, are repeated. However, assuming that the number of pixels having an output which is greater than threshold 1 exceeds threshold 2, which may be 32 activated monitored pixels 140, the process advances to step 230 of the flowchart 220. Of course, the threshold 2 may be either more or less than 32 activated monitored pixels 140.

If the number of pixels which are activated, that is, exceed threshold 2, is maintained for a period of time which exceeds threshold 3, a dispensed product drop has been detected. This is indicated by step 232 of the flowchart 220 (FIG. 11). In one specific instance, the time for threshold 3 was four (4) frames with a frame rate of sixty frames/second or approximately 0.0667 seconds. Of course, threshold 3 may be either more less than 0.0667 seconds.

It should be understood that the process represented by the flow chart 220 is continuously repeated. Thus, the sensor assembly 104 may be considered as functioning as a video camera. The video camera forming the sensor assembly 104 has a large group 128 of pixels of which only a small array of pixels 140 are monitored. The output from the small array of pixels 140 is continuously monitored.

Figure 12:
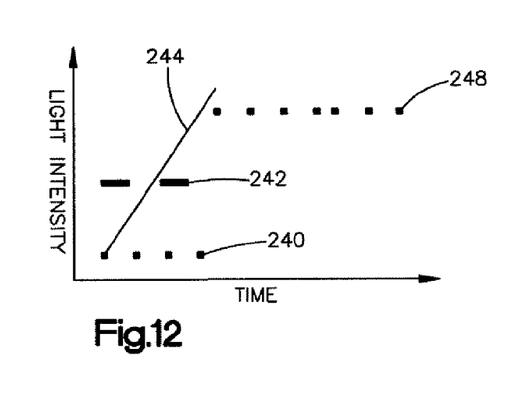
FIG. 12 is a schematic visual representation of the manner in which the intensity of light at a monitored pixel in the array of pixels in FIG. 5 changes when a product is dispensed and depicting the relationship between the intensity of light at the monitored pixel and a change in intensity of light required to activate the pixel.

The relationship between the actual output from a pixel 140 and the output represented by threshold 1 is indicated schematically in the graph of FIG. 12. The initial output of a pixel 140 is represented by a series of rectangular dots 240. The output represented by the sum of a reference frame and threshold 1 for an activated pixel 140, is indicated by a series of dashes 242. Although only two dashes 242 have been indicated schematically in FIG. 12, it should be understood that the sum of the reference frame and threshold 1, as represented by the dashes 242 continues with a passage of time.

If a dispensed article moves quickly into the field of view of one or more of the monitored pixels 140, the magnitude of the output signal of the monitored pixel increases in the manner indicated by the continuous line 244 in FIG. 12. Thus, when a dispensed product moves into the field of view of a monitored pixel 140, the output of the monitored pixel quickly increases in the manner indicated by the line 244 in FIG. 12 and the monitored pixel is considered to be activated. The output of the monitored pixel 140 remains at a relatively high level, that is, at a level above threshold 1, while the dispensed product passes through the field of view of the monitored pixel. The relatively high output of a monitored pixel 140 which has been activated by movement of a dispensed product into its field of view is indicated by the series of dots indicated at 248 in FIG. 12.

Assuming that a dispensed product has moved into a field of view of the monitored pixels 140, the output of at least one of the pixels 140 having a field of view which is intersected by the dispensed product, will remain at the relatively high level indicated at the series 248 of dots while the dispensed product moves through the field of view of the one pixel. Although the output for only one monitored pixel 140 has been illustrated in FIG. 12, it should be understood that all of the monitored pixels 140 have responses similar to the response illustrated in FIG. 12.

It is contemplated that ambient conditions around the vending machine 10 may gradually change with a passage of time. For example, the amount of ambient light around the vending machine may change as the time of day changes from morning to afternoon or from afternoon to evening. This change in the ambient conditions around the vending machine will occur relatively slowly. This will result in a relatively slow change in the output or intensity of the monitored pixels 140. This relatively slow change in the output of the monitored pixels 140 with increasing ambient light is indicated by the solid line 254 in FIG. 13.

To compensate for this gradual change in the ambient conditions around the dispensed product detection apparatus 100 (FIG. 2), the value of the pixel threshold, the sum of the reference frame and threshold 1 is adjusted. Thus, the magnitude of the output signal of a monitored pixel 140 required to indicate that a dispensed article has been sensed is adjusted to compensate for changing ambient conditions, which change slowly compared to changes caused by a falling product. The changing ambient light conditions are detected by sensing the ambient light intensity adjacent to the group 128 of pixels and/or at various locations along the path of movement of a dispensed product from a product dispensing location 54 to the product retrieval location 60. A photoresistor or a photodiode may be used to sense changes in ambient light conditions.

Figure 13:
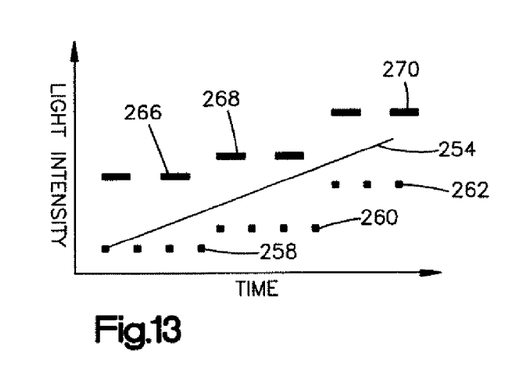
FIG. 13 is a schematic visual representation of the manner in which the intensity of light at a monitored pixel in the array of pixels in FIG. 5 may change with time due to changing ambient conditions and indicating the relationship between the light intensity sensed by the pixel and a change in intensity required to activate the pixel.

The initial or inactive output signal from one monitored pixel 140 during relatively low ambient lighting is indicated by a series of dots 258 (FIG. 13). As light in the ambient conditions to which the group of 128 of pixels is exposed increases, the output of the monitored pixel 140 increases in magnitude. This increase in the output signal of a monitored pixel 140 is indicated by a series 260 of dots. As the ambient light increases still further, the intensity or output signal of a monitored pixel increases to a magnitude indicated by a series 262 of dots.

As the ambient lighting and the initial output from a monitored pixel 140 increases in the manner indicated schematically by the series 258, 260 and 262 (FIG. 13) of dots, the output from a monitored pixel required to indicate the sensing of a dispensed product, is increased. Thus, as the intensity of ambient lighting conditions increases, the monitored pixel output required to indicate sensing of a dispensed product (the sum of the reference frame and threshold 1) increases from an output indicated by a dashed line 266 to an output indicated by a dashed line 268 in FIG. 13. Thus, when the output of a monitored pixel 140 due to ambient or initial conditions is at the level indicated by the series 258 of dots, the magnitude of the output signal from a monitored pixel 140 required to indicate detection of a dispensed product (the sum of the reference frame and threshold 1) is at a level indicated by a dashed line 266 in FIG. 13.

As the ambient lighting conditions cause the initial output signal of the monitored pixel 242 to increase from the magnitude indicated by the series of dots 258 to the magnitude of the series 260 of dots, the magnitude of the sum of the reference frame and threshold 1 is increased from the magnitude indicated by the dashed line 266 to the magnitude indicated by the dashed line 268. Similarly, when the magnitude of the initial or inactive output signal from a monitored pixel 140 increases from the magnitude indicated by the series of dots 260 to the magnitude indicated by the series of dots 262, the magnitude of the sum of the reference frame and threshold 1 is increased from the level indicated by the dashed line 268 to the magnitude indicated by the dashed line 270.

Pixel Viewing Pattern

The monitored pixels 140 (FIG. 5) are disposed in an array having a configuration which is selected so that dispensed product will pass through the fields of view 176 and/or focal planes 174 (FIG. 7) of a substantial number of the monitored pixels 140. In one specific embodiment of the invention, the array of monitored pixels 140 was arranged in a pattern which resulted in a dispensed product passing through the field of view 176 and/or focal planes 174 of more than 32 of the monitored pixels 140 (threshold 2). However, it should be understood that threshold 2 may be any desired number of activated monitored pixels 140.

When a dispensed product passes through the field of view 176 of a monitored pixel 140, the output signal of the monitored pixel increases to a magnitude greater than threshold 1, due to reflection of light from the dispensed product. The increase in the output of the monitored pixel 140 indicates that a dispensed product may have been sensed by the activated monitored pixel. The number of fields of view of the monitored pixels 140 which will be interrupted by movement of a dispensed product from a product dispensing location 54 to a product retrieval location 60 will depend upon the size of the dispensed product, the configuration of the array of monitored pixels 140, the configuration of the path or channel along which the dispensed product moves from a product dispensing location 54 to the product retrieval location 60, and the number of monitored pixels. In order to minimize the cost of the electronic computing circuitry associated with the dispensed product detection apparatus 100 (FIG. 2), the number of monitored pixels 140 should be minimized. However, the number of monitored pixels 140 must be great enough to be certain that the dispensed product will pass through a predetermined number (threshold 2) of the fields of view 176 of the monitored pixels 140.

Figure 14:
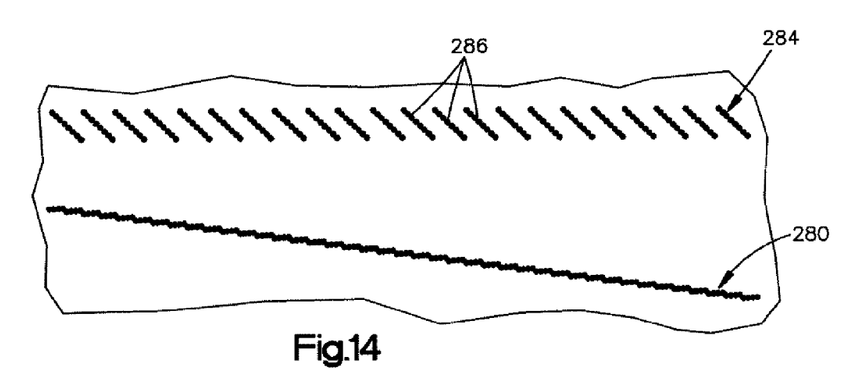
FIG. 14 is a schematic illustration of a pattern which may be formed along a path of movement of a dispensed product by fields of view of monitored pixels in the group of pixels of FIG. 5.

One pattern for the positions of the focal planes 174 and fields of view 176 of the monitored pixels 140 is indicated in FIG. 14. The location of the focal plane 174 and field of view 176 of a monitored pixel 140 are indicated schematically by a dot in FIG. 14. The dots are arranged in a pattern.

In the specific pattern illustrated in FIG. 14, the dots indicating the focal planes 174 and fields of view 176 of monitored pixels 140 are disposed in two discreet lines which extend across the path of movement of a dispensed product. One of the lines is a linear array of closely adjacent dots and is indicated at 280 in FIG. 14. In addition, a linear array 284 of line segments 286 is provided across the path of movement of the dispensed product. The linear array 284 of line segments 286 has a longitudinal central axis which is skewed at an acute angle to the linear array 280 of dots. However, the linear array 284 of line segments 286 may extend parallel to the array 280 of closely adjacent dots. It should be understood that although only one linear array 280 of dots and one linear array of line segments 286 has been illustrated in FIG. 14, a greater number of linear arrays 280 of dots and/or a greater number of linear arrays 284 of line segments 286 could be provided if desired. The pattern is constructed to intersect the edges of the product retrieval location 60 as seen by the group 128 of pixels.

Figure 15:
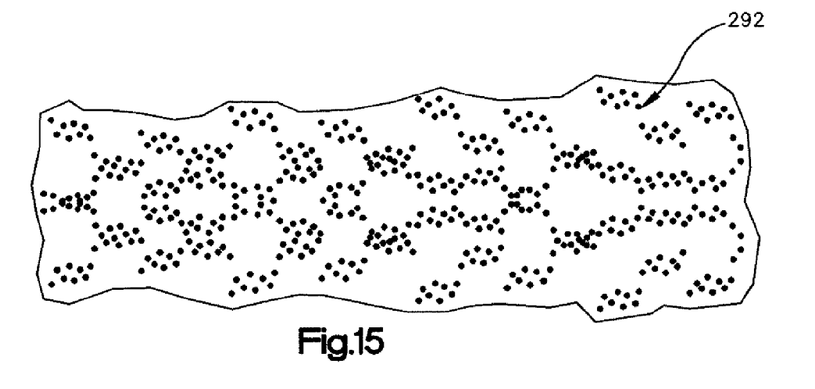
FIG. 15 is a schematic illustration, similar to FIG. 14, of an alternative pattern which may be formed along a path of movement of a dispensed product by fields of view of monitored pixels in the group of pixels in FIG. 5.

A second pattern of focal planes 174 and fields of view 176 of monitored pixels 140 is indicated schematically in FIG. 15. The focal planes 174 and fields of view 176 of the monitored pixels 140 have been illustrated by an array 292 of dots. The dots are arranged in a pattern which has been configured so as to be certain that a dispensed product cannot pass through the array 292 of dots without intercepting the fields of view of a number of pixels which is greater than the predetermined number of pixel (threshold 2) required to move from step 228 to step 230 in the flowchart 220 of FIG. 11.

It should be understood that any desired pattern of focal planes 174 and fields of view 176 of monitored pixels 140 may be utilized in association with the path of movement of the dispensed product from the product dispensing locations 54 to a product retrieval location 60. The fields of view 176 and, correspondingly, the pattern of dots associated with the monitored pixels 140, may be disposed at any location along the path of movement of a dispensed product between the product dispensing location 54 and the product retrieval location 60. For example, the patterns illustrated in FIGS. 14 and/or 15 may be disposed along the path of movement of the dispensed products at a location above the product retrieval location 60. Alternatively, one of the patterns illustrated in FIGS. 14 and 15 may be disposed on a surface of the product retrieval location 60.

Although only two patterns have been illustrated schematically in FIGS. 14 and 15, it is contemplated that any one of many different patterns may be selected. It is also contemplated that patterns may be disposed at different levels along the path of movement of a dispensed product from the product dispensing location 54 to a product retrieval location 60. Thus, if desired, one pattern may be disposed immediately above the product retrieval location 60 while a second pattern may be disposed on or at an upwardly facing lower surface of the product retrieval location 60.

If a plurality of product sensor assemblies, corresponding to the product sensor assembly 104, are utilized in the manner illustrated schematically in FIG. 4 for product sensor assemblies 114, 116, 120 and 122, the monitored pixels 140 may be disposed in arrays having different configurations in each of the sensor assemblies. For example, a pattern corresponding to the pattern illustrated schematically in FIG. 14 may be associated with one sensor assembly. A pattern corresponding to the pattern illustrated in FIG. 15 may be associated with another sensor assembly. It is contemplated that a pattern associated with one sensor assembly may extend across the channel or path of movement of a dispensed product from the product dispensing locations 54 to the product retrieval location 60 at one level disposed a first distance above the product retrieval location 60 while a second pattern which is different than the one pattern is disposed at a second level relative to the product retrieval location 60.

In view of the foregoing description it is apparent that the present invention provides a new and improved method and apparatus for use in a vending machine 10 having a plurality of product dispensing devices 24. Each of the product dispensing devices 24 holds a product to be dispensed from the dispensing device. In accordance with one of the features of the present invention, an array of pixels 140 is monitored to detect a change in the intensity of light at the pixels 140 in the array upon movement of a dispensed product from a product dispensing location 54 to a product retrieval location 60.

In accordance with another feature of the invention, a group 128 of pixels is provided and the aforementioned array of monitored pixels 140 forms part of the group of pixels. The monitored array of pixels 140 contains a number of pixels which is less than the total number of pixels in the group 128 of pixels. The pixels which are selected to form the array of monitored pixels 140 have fields of view which form a desired pattern across at least a portion of a path along which a dispensed product moves from a dispensing location 54 to the product retrieval location 60. The number of monitored pixels 140 in the array of monitored pixels may advantageously be less than fifty (50%) of the pixels in the group 128 of pixels and even more advantageously be less than twenty (20%) of the pixels in the group of pixels.

The present invention has a number of features. These features may be utilized together as disclosed herein. These features may be utilized separately and/or in various combinations with each other or the prior art.

Having described the invention, the following is claimed:

1. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, wherein said step of detecting a change in the intensity of light at pixels in the array of pixels includes determining whether or not the intensity of light at one of the pixels in the array of pixels is greater than a predetermined intensity.

2. A method as set forth in claim 1 wherein said step of detecting a change in the intensity of light at pixels in the array of pixels includes determining whether or not the number of pixels in the array of pixels exposed to light having an intensity which is greater than the predetermined intensity is greater than a predetermined number of pixels.

3. A method as set forth in claim 2 wherein said step of detecting a change in the intensity of light at pixels in the array of pixels includes determining whether or not the predetermined number of pixels exposed to light having an intensity which is greater than the predetermined intensity is than a predetermined value.

4. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, wherein said step of detecting a change in the intensity of light at pixels in the array of pixels includes determining whether or not the intensity of light at one pixel in the array of pixels exceeds a predetermined reference intensity, periodically sensing light intensity along at least a portion of a path along which a dispensed product moves from a product dispensing location to the product retrieval location, and changing the predetermined reference intensity in response to a predetermined change in light intensity along at least a portion of the path along which a dispensed product moves.

5. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, further including the steps of providing a group of pixels containing a number of pixels which is greater than the number of pixels in the array of pixels, selecting pixels from the group of pixels to form the array of pixels with fields of view of the pixels in the array of pixels forming a desired pattern across at least a portion of the path along which a dispensed product moves from a dispensing location to the product retrieval location.

6. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, further including the step of positioning the array of pixels in a desired position relative to the path along which a dispensed product moves from a dispensing location to the product retrieval location by interconnecting a laser and the array of pixels, and, thereafter, mounting the array of pixels in a desired position relative to the path along which a dispensed product moves, said step of mounting the array of pixels includes directing a beam from the laser to a predetermined location in the vending machine while the laser is connected with the array of pixels and interconnecting the array of pixels and the vending machine.

7. A method as set forth in claim 6 further including the step of disconnecting the laser from the array of pixels after having performed said step of mounting the array of pixels.

8. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, further including the step of positioning the array of pixels in a desired position relative to the path along which a dispensed product moves from a dispensing location to the product retrieval location by positioning a member having a plurality of light sources relative to the path along which a dispensed product moves to the product retrieval location, determining the positions of a plurality of reference locations relative to the array of pixels, and aligning the array of pixels with the plurality of reference locations.

9. A method as set forth in claim 8 wherein said step of determining the positions of a plurality of reference locations relative to the array of pixels includes energizing the plurality of light sources to change the intensity of light at pixels having fields of view aligned with the light sources.

10. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, further including the step of providing a group of pixels, said step of monitoring the sensed intensity of an array of pixels includes monitoring the intensity of light at an array of pixels containing less than fifty percent (50%) of the pixels in the group of pixels.

11. A method as set forth in claim 10 wherein the step of monitoring the intensity of light at an array of pixels containing less than fifty percent (50%) of the pixels in the group of pixels includes monitoring the intensity of light at an array of pixels containing less than twenty percent (20%) of the pixels in the group of pixels.

12. A method comprising the steps of providing a vending machine having a plurality of product dispensing locations from which products are moved to a product retrieval location, monitoring the intensity of light at an array of pixels, detecting a change in the intensity of light at pixels in the array of pixels upon movement of a dispensed product from a product dispensing location to a product retrieval location, and providing a control signal in response to detection of a change in the intensity of light at pixels in the array of pixels, further including the step of positioning the array of pixels in a desired position relative to the path along which a dispensed product moves from a dispensing location to the product retrieval location by positioning an optical pattern relative to the path along which a dispensed product moves to the product retrieval location, and aligning the array of pixels with the optical pattern.

13. A method comprising the steps of providing a vending machine having a plurality of product dispensing locations from which products are moved to a product retrieval location, interconnecting a laser and an array of pixels, mounting the array of pixels in the vending machine at a desired position relative to a path along which a dispensed product moves from one of the product dispensing locations to the product retrieval location, said step of mounting the array of pixels includes directing a beam from the laser to a predetermined location in the vending machine while the laser is connected with the array of pixels and interconnecting the array of pixels and the vending machine, monitoring the intensity of light at the array of pixels, detecting a change in the intensity of light at pixels in the array of pixels upon movement of a dispensed product from a product dispensing location to the product retrieval location after the array of pixels have been connected with the vending machine, and providing a control signal in response to detection of a change in the intensity of light at pixels in the array of pixels.

\* \* \* \* \*